Figure 18:
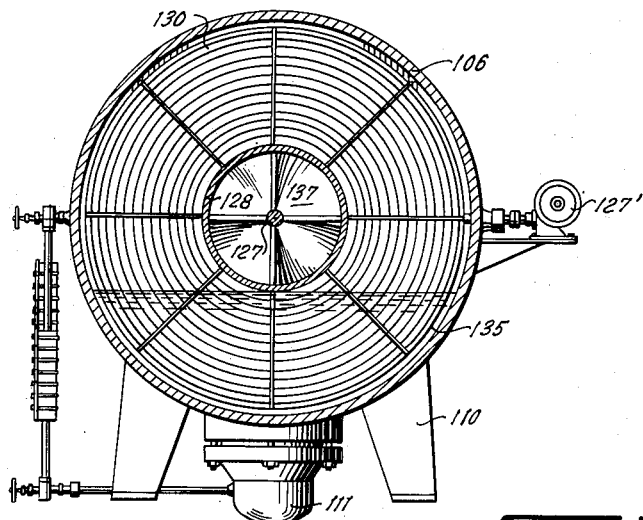

June 18, 1957 W. R. KING 2,796,145
GAS CLEANERS
Filed Jan. 27, 1953 9 Sheets-Sheet 1
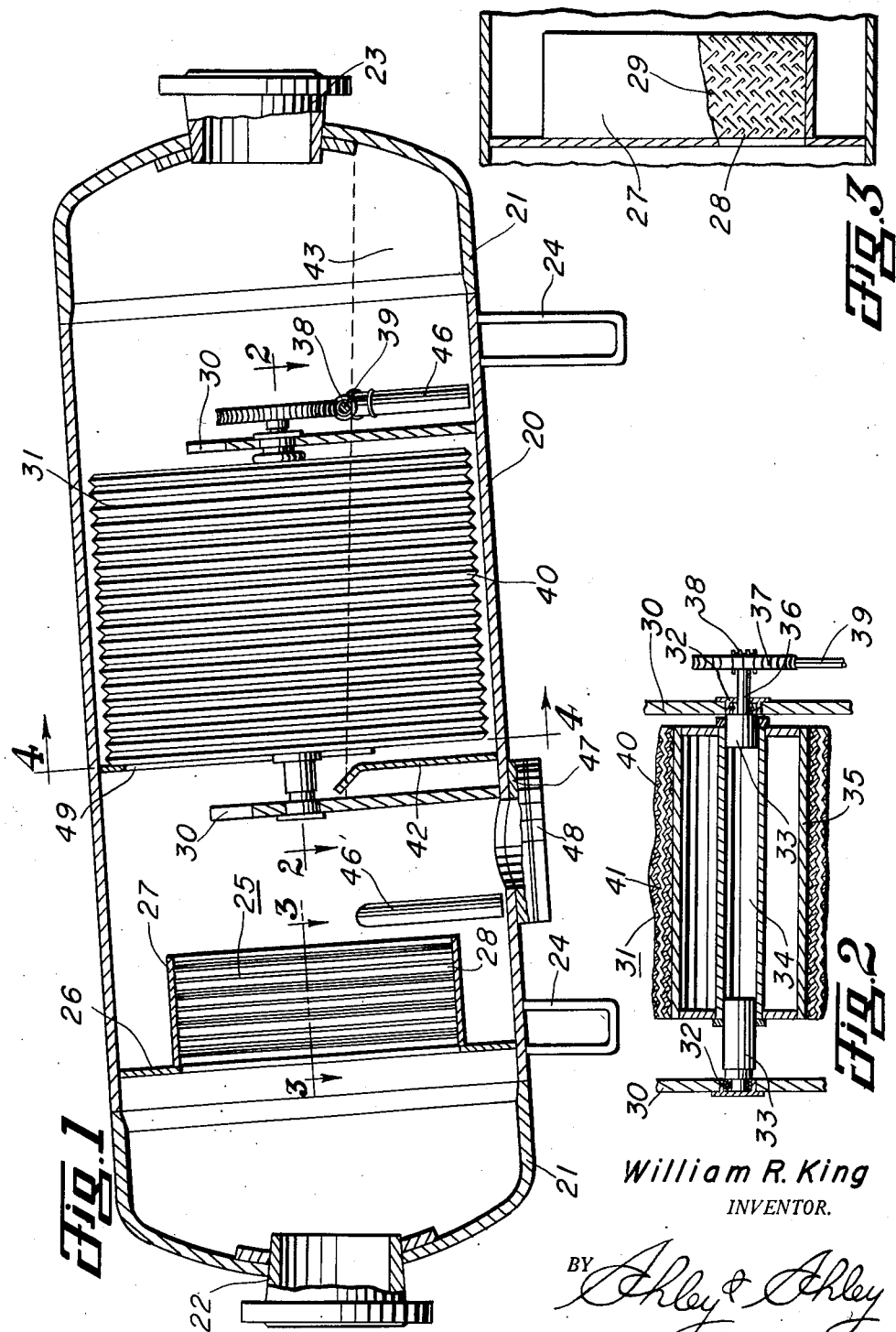
William R. King
INVENTOR.

June 18, 1957 W. R. KING 2,796,145
GAS CLEANERS
Filed Jan. 27, 1953 9 Sheets-Sheet 2
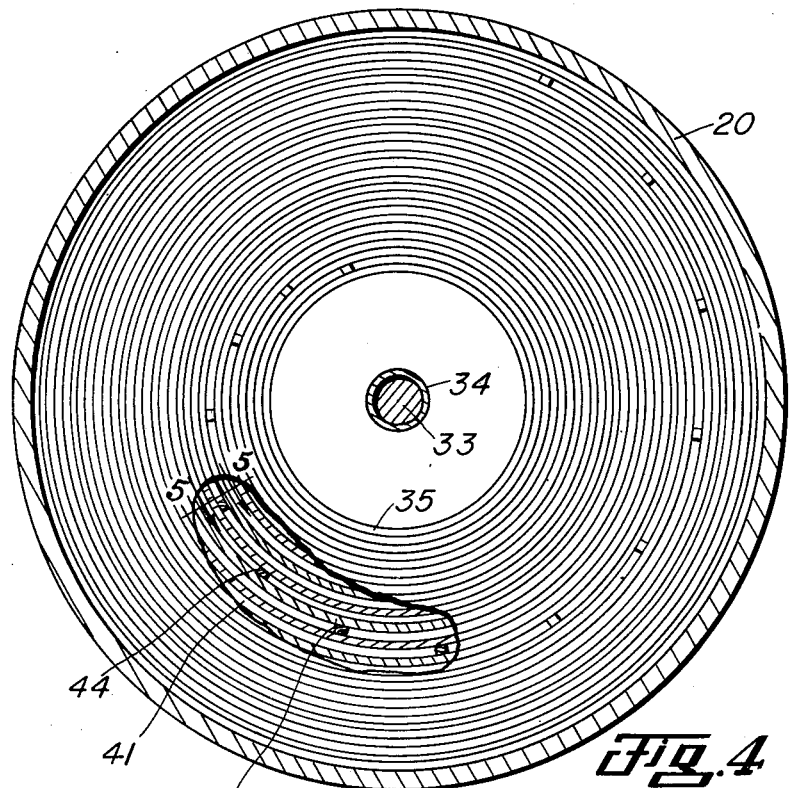
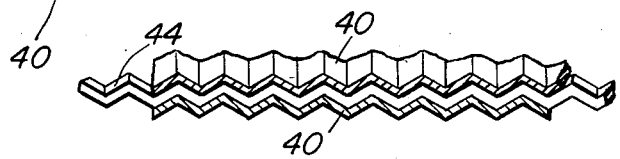
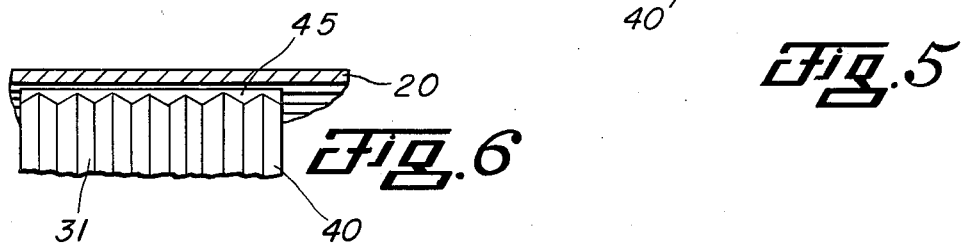
William R. King
INVENTOR.

June 18, 1957   W. R. KING   2,796,145
GAS CLEANERS
Filed Jan. 27, 1953   9 Sheets-Sheet 3
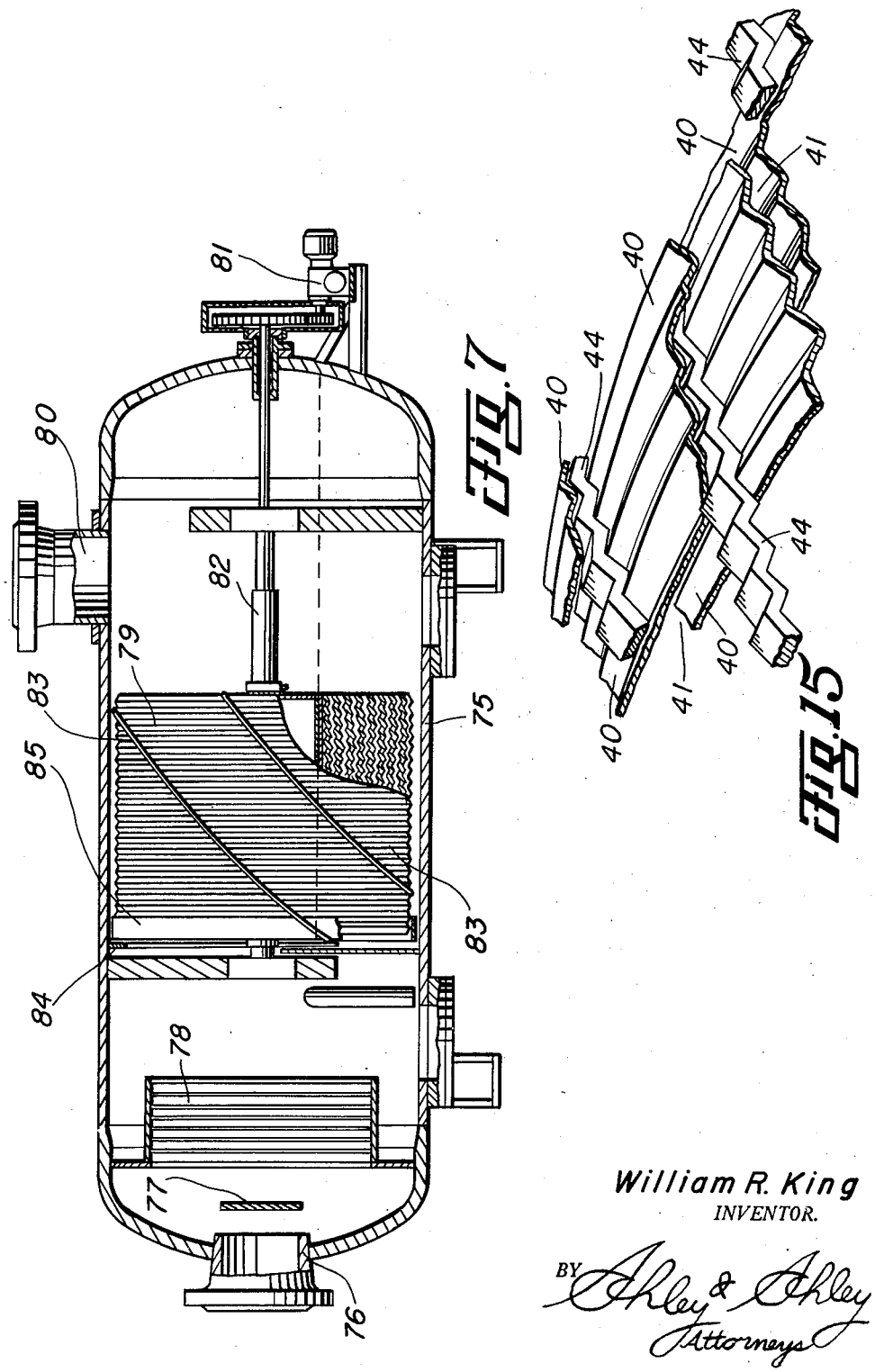
William R. King
INVENTOR.
BY Ashley & Ashley
Attorneys

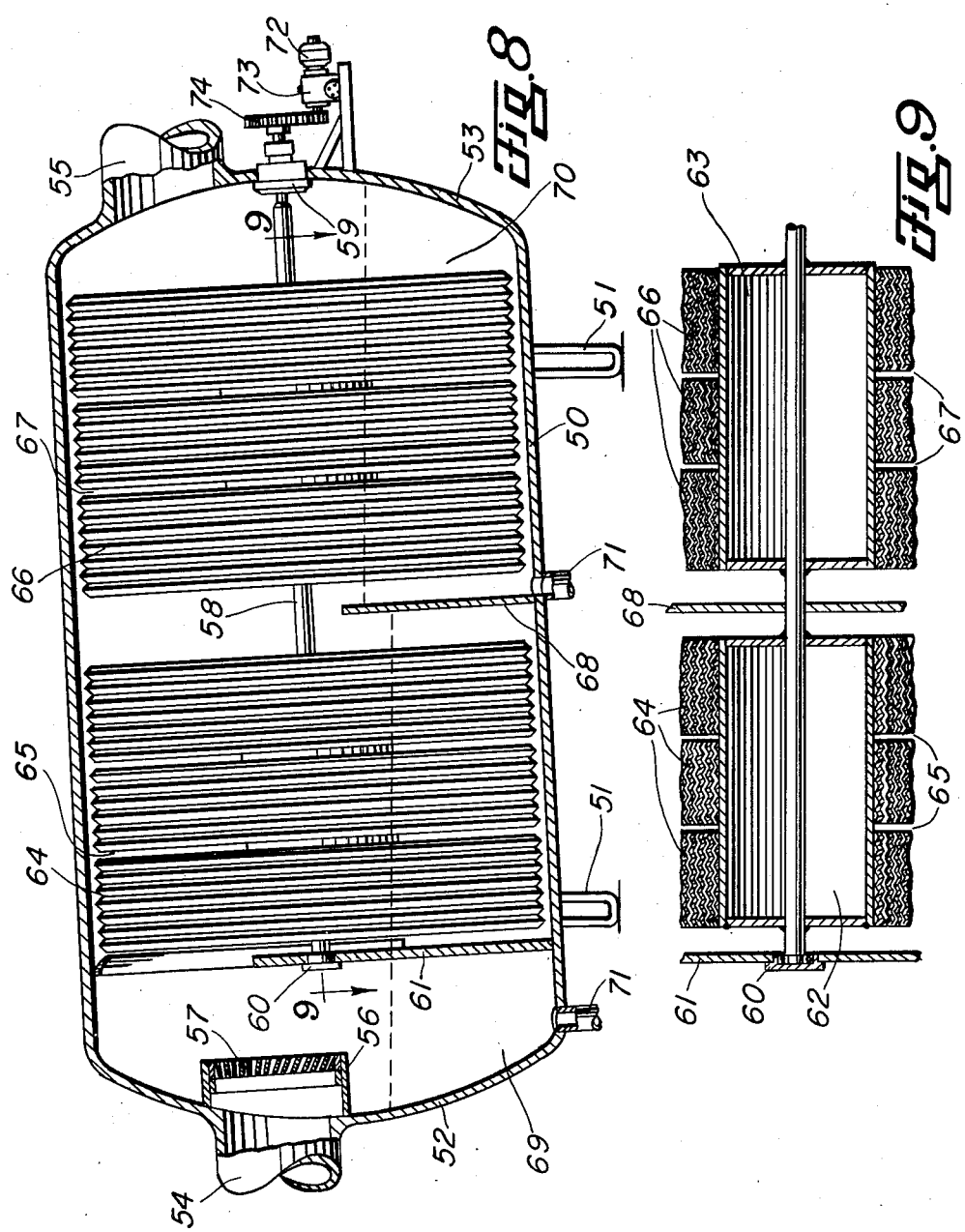

June 18, 1957 — W. R. KING — 2,796,145
GAS CLEANERS
Filed Jan. 27, 1953 — 9 Sheets-Sheet 5
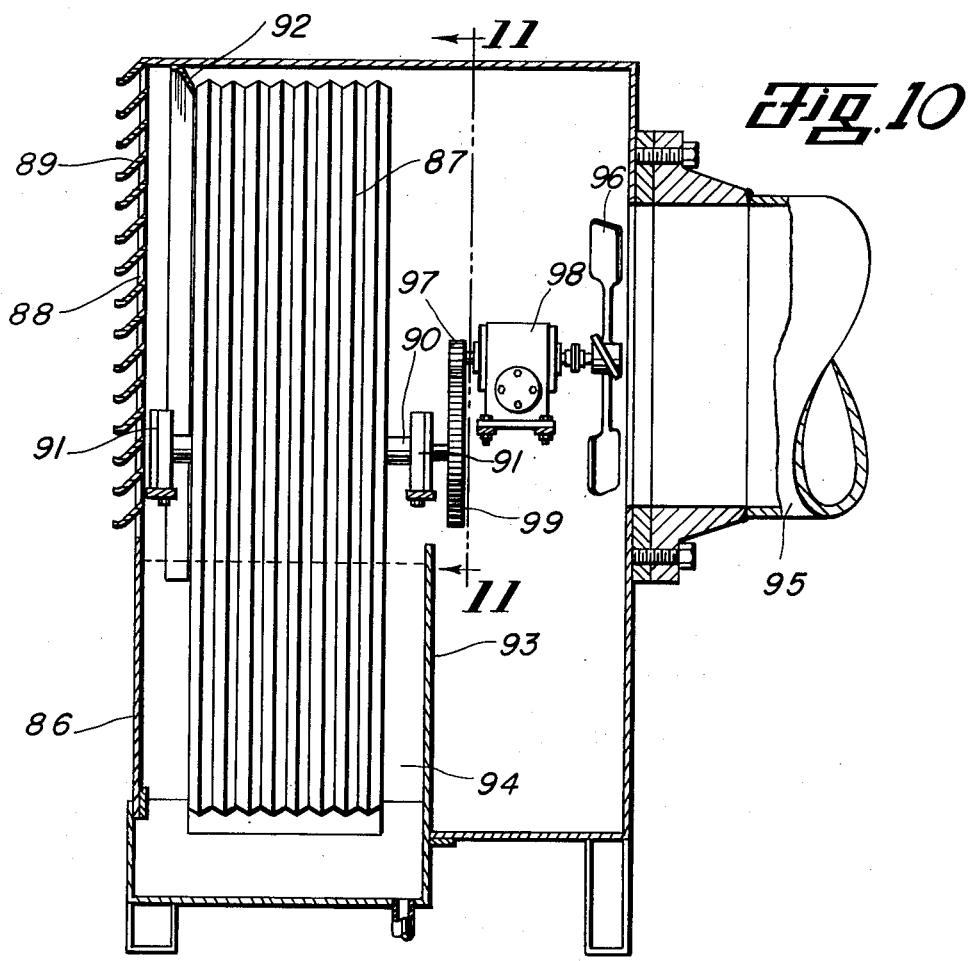
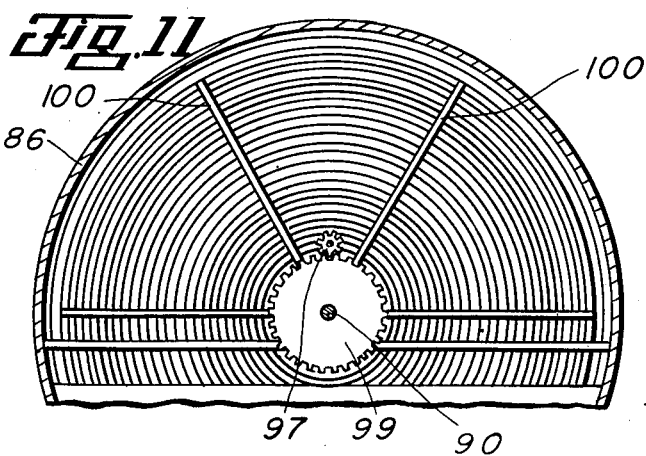
William R. King
INVENTOR.

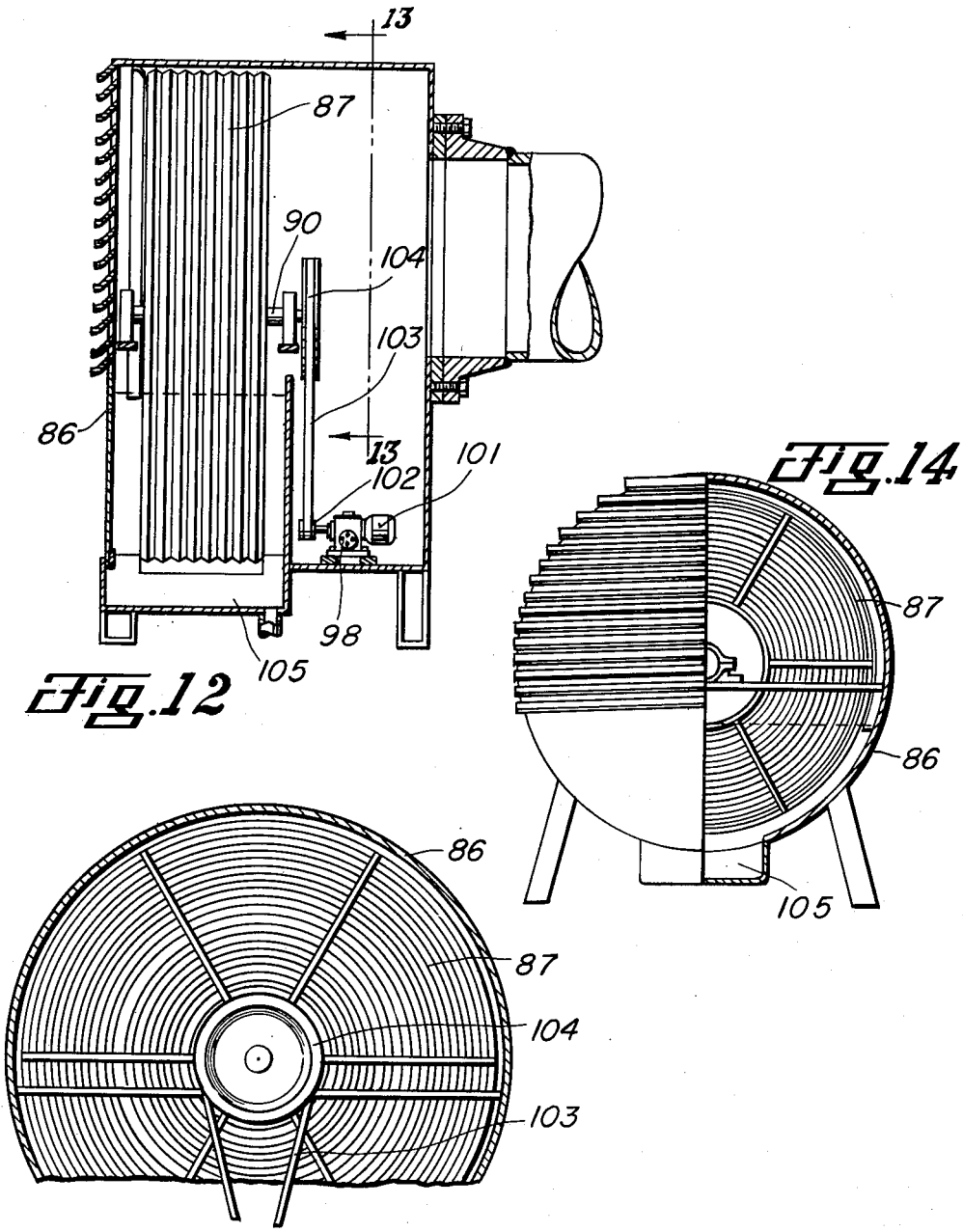

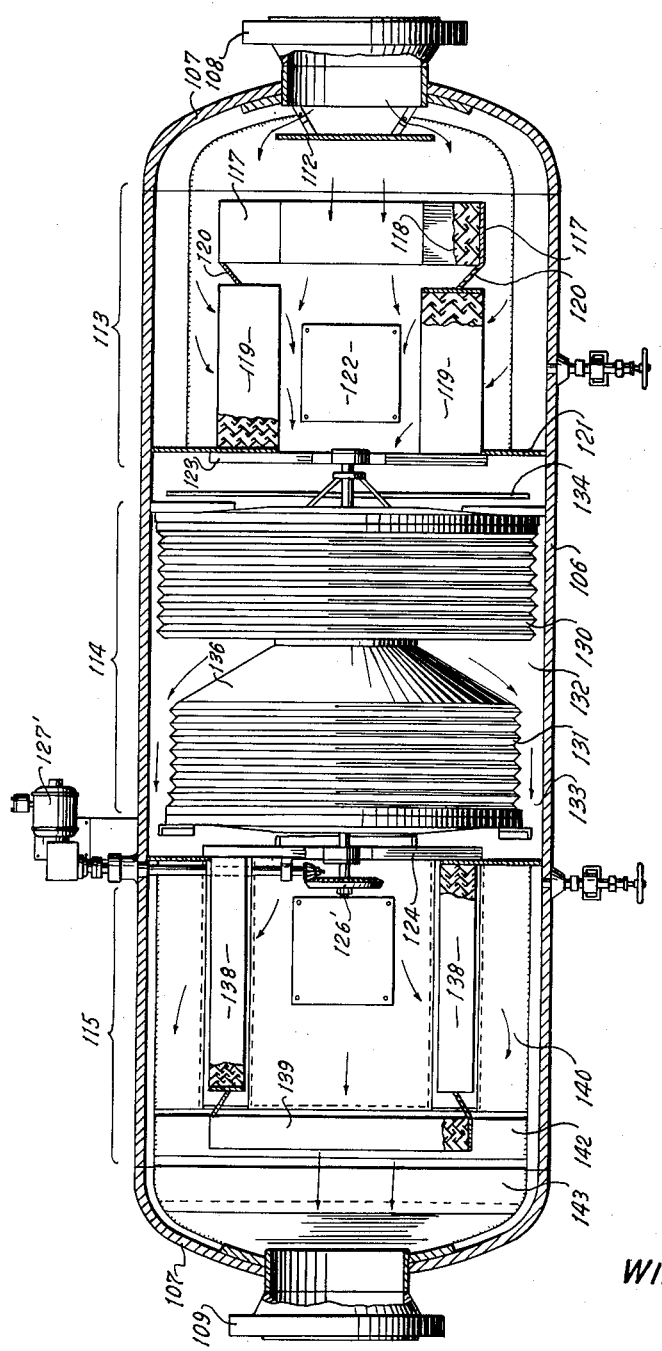

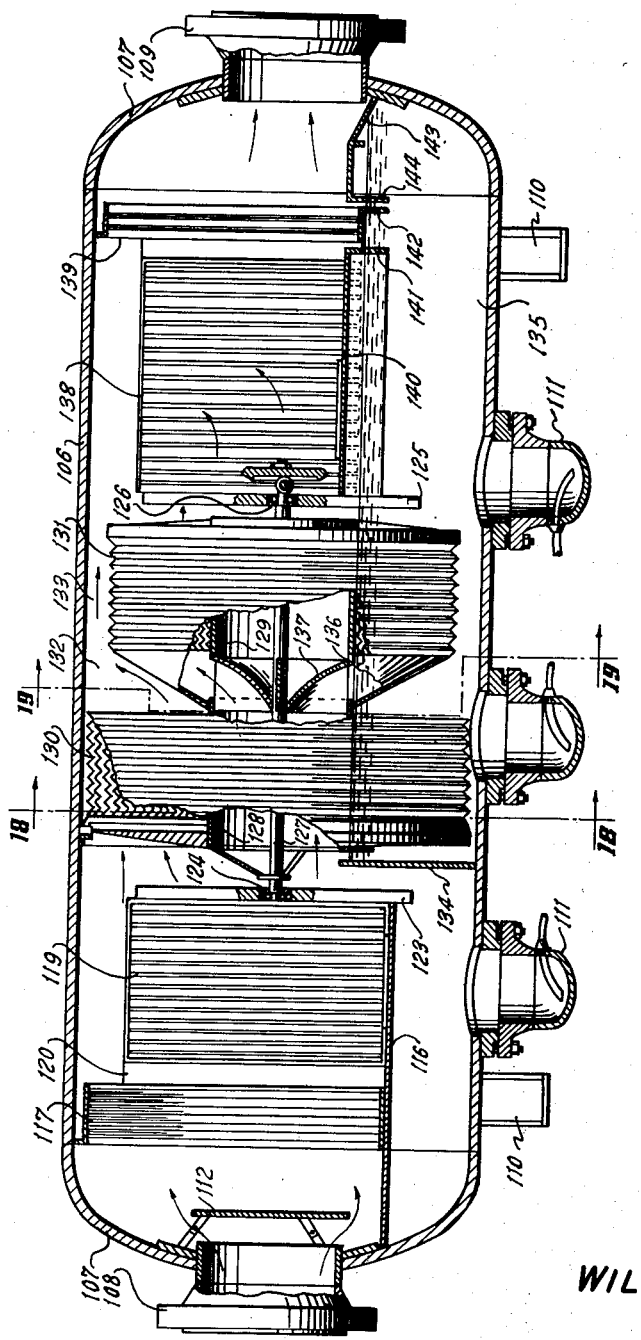

June 18, 1957 W. R. KING 2,796,145
GAS CLEANERS

Filed Jan. 27, 1953 9 Sheets-Sheet 9

WILLIAM R. KING
INVENTOR.

BY Ashley & Ashley

ATTORNEYS

United States Patent Office 2,796,145
Patented June 18, 1957

2,796,145

GAS CLEANERS

William Roy King, Longview, Tex.

Application January 27, 1953, Serial No. 338,494

16 Claims. (Cl. 183—8)

This invention relates to new and useful improvements in gas cleaners.

One object of the invention is to provide an improved cleaner, scrubber, or filter, for gases such as air, natural gases, and the like, which is very effective in removing liquids, dirt, or other foreign matters from a gas passing therethrough.

An important object of the invention is to provide an improved gas cleaner or scrubber having in a single vessel a section for separating liquids from the gas and a section for removing solid particles from the gas, the sections being arranged in the order recited whereby a compact, material-saving, efficient scrubber structure is had, whereby pressure drops through the scrubber structure are held at a minimum, and whereby possible malfunctioning of the scrubber is avoided.

Another object of the invention is to provide an improved device of the character described having a novel type of filter or scrubber element.

Yet another object of the invention is to provide an improved device of the character described having a drum-like cleaner or scrubber element which is adapted to be revolved through a liquid bath, such as a body of oil, so as to offer to the gas stream a constantly replenished surface of cleaning liquid which will entrap and remove foreign material from the gas stream.

A particular object of the invention is to provide an improved device of the character described in which a gas stream is forced to follow a tortuous passage between surfaces wet with a liquid particularly adapted to removing foreign material from the gas stream, but wherein the resistance to the flow of the gas is held to a minimum in view of the scrubbing and cleaning action involved.

A further object of the invention is to provide an improved device of the character described having means for preventing the accumulation of sediment underneath the revolving scrubber element so as to eliminate the possibility of such deposit impeding the movement of the cleaning device through said liquid bath.

Still another object of the invention is to provide an improved device of the character described having a scrubbing or cleaning drum composed of a plurality of concentrically-arranged cylinders, and wherein means is provided for preventing the trapping of a cleaning fluid, such as oil, between pairs of the cylinders without replacement or replenishment, thus assuring a fresh supply of the liquid to the spaces between each pair of cylinders at all times.

A further object of the invention is to provide an improved device of the character described which may be power driven or may be driven by energy absorbed from the flowing gas stream, and which is readily adaptable for use as a gas scrubber, or as an air filter.

Yet another object of the invention is to provide an improved gas cleaner having a novel scrubber element with a central drum or core and scrubbing surfaces surrounding said core partially immersed in a body of cleaning liquid, wherein the core permits the cleaning liquid to be carried at a lower level so that additional gas passage space is had.

A particular object of the invention is to provide an improved gas scrubber having consecutive scrubber elements arranged in a vessel, each element being of such area as to occupy the major portion of the vessel cross-section whereby large areas and high scrubbing efficiencies for the elements are provided, the gas stream being divided into separate portions each of which flows through one of the scrubber elements whereby the gas scrubbing capacity of a vessel of given size is greatly increased.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a longitudinal, vertical, sectional view of a gas scrubber constructed in accordance with this invention, Fig. 2 is a horizontal, longitudinal, sectional view taken upon the line 2—2 of Fig. 1 and showing the provision for mounting the scrubber drum, Fig. 3 is a view similar to Fig. 2 taken upon the line 3—3 of Fig. 1 and illustrating the inlet separator structure, Fig. 4 is an enlarged, vertical, cross-sectional view taken upon the line 4—4 of Fig. 1, the view being partially broken away to illustrate the drum structure, Fig. 5 is an enlarged sectional view taken upon the line 5—5 of Fig. 4, Fig. 6 is an enlarged fragmentary view of the outer periphery of the drum illustrating the agitating arrangement, Fig. 7 is a vertical, longitudinal, sectional view illustrating a modified form of the gas scrubber.

Figure 19:
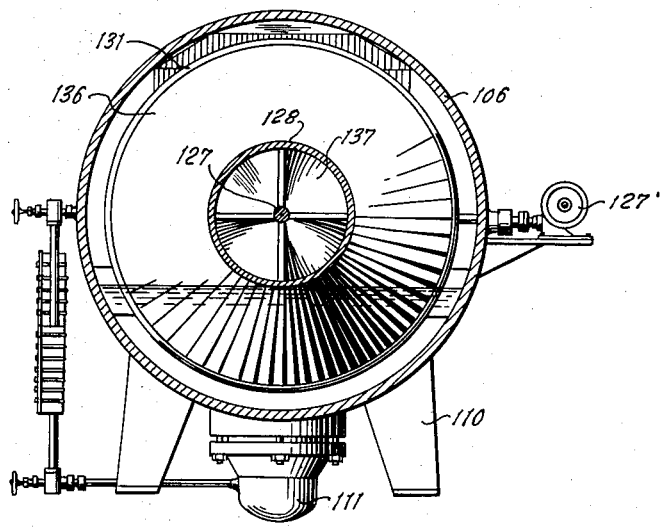

Fig. 8 is a vertical, longitudinal, sectional view illustrating a further modification of the gas scrubber, Fig. 9 is a horizontal, longitudinal, sectional view taken upon the line 9—9 of Fig. 8, Fig. 10 is a vertical, sectional view of an air filter or cleaner constructed in accordance with this invention, Fig. 11 is a transverse, vertical, sectional view taken upon the line 11—11 of Fig. 10, Fig. 12 is a vertical, sectional view of a modified form of the air filter or cleaner, Fig. 13 is a vertical, transverse, sectional view taken upon the line 13—13 of Fig. 12, Fig. 14 is a view, partly in elevation and partly in section, taken from the inlet side of the air filter or cleaner illustrated in Figs. 10 and 12, Fig. 15 is a fragmentary, isometric view showing the partition rods between the cylinders of the scrubbing structure, Fig. 16 is a longitudinal, horizontal, sectional view illustrating a modification of the invention, Fig. 17 is a longitudinal, vertical, sectional view taken at right angles to Fig. 16, and Figs. 18 and 19 are vertical, cross-sectional views taken upon the respective lines of Fig. 17.

This application is a continuation-in-part of my co-pending application, Serial No. 143,201, filed February 9, 1950, and now abandoned.

In the drawings, the numeral 20 designates an elongate cylindrical shell having its ends closed by suitable dished-heads 21. A gas inlet fitting 22 extends through one of the heads, and a similar gas outlet fitting 23 is similarly positioned medially of the opposite head 21 and projects substantially axially therefrom. As appears in Fig. 1, the tank or shell 20 is carried upon suitable supports or legs 24, those adjacent the outlet fitting 23 being of greater length whereby the tank is positioned with a slight upward inclination between its inlet and outlet. Because it is customarily desirable to have the axes of fitting connections extending parallel to the surface upon which a piece of equipment is to be supported, the inlet and outlet fittings 22 and 23, respectively, are not positioned exactly axially with respect to the heads 21, but are positioned so as to have their axes parallel to the surface upon which the device is supported.

The particular modification of the invention shown in Fig. 1 is especially adapted for use as a gas scrubber and in any instance in which it is desired to remove liquids, dirt, dust, and other foreign material from a stream of air or other gases, such as natural gas. A specific example of such a use would be the scrubbing of natural gas on a main gas transmission line ahead of compressor stations, city distribution stations, and the like where it is desirable, if not essential, to remove all extraneous matter from the gas. In such a case, said gas often alternates from a wet-quality gas to a dry-quality gas; and this particular invention is so devised to remove objectionable material both in the liquid and the solid state.

To effect an initial cleaning and separation of the gas and liquid particles entering the shell through the fitting 22, a separating or scrubbing unit 25 is carried upon an apertured plate 26 extending transversely of the shell 20 adjacent the inlet fitting 22. The separating unit includes a rectangular housing 27 having its sides open and substantially in alinement with the inlet fitting 22, there being provided a plurality of vertical vane plates or strips 28 within said housing. The strips are disposed at an angle so as to deflect the gas stream laterally, as shown in Fig. 3, and each succeeding row of the strips is disposed at an opposing angle with respect to the preceding row of strips whereby the gas is forced to follow a tortuous path of constantly changing direction. In addition, each of the strips has its downstream edge bent upon itself to form vertical portions 29 of U-shaped cross-section which act as small vertical troughs in which liquid collects and down which the liquid may flow so as to drain into the lower portion of the shell 20. The separator unit serves to remove mechanically entrained particles of liquid from the incoming gas, and some of the foreign matter.

Adjacent the central portion of the shell 20 and downstream of the separator 25 are provided a pair of transverse spiders 30 which serve as bearing supports for a revolving scrubber drum 31. As shown in Fig. 2, each of the spiders is provided with a suitable anti-friction bearing 32, and stub-shafts 33 are mounted therein. The shafts face one another and have press fits within the ends of a tubular sleeve extending therebetween, the sleeve in turn carrying a cylindrical drum core 35. The downstream stub-shaft carries an extension 36 projecting through the downstream spider 30, and a worm-gear wheel 37 is secured upon the extremity of the projecting shaft. A suitable driving worm 38 meshes with the worm-wheel 37 and is revolved by a shaft 39 extending through the side wall of the shell 20 to an electric motor or other suitable source of motive power (not shown). Means is thus provided for supporting and revolving the drum core 35.

A plurality of concentric drum elements 40 are carried upon the drum core 35, each of the elements being in the form of an open-ended cylinder having corrugations extending circumferentially thereof and arranged parallel to one another in adjacent intervals along the axes of said cylinders. Sharp-cornered corrugations are illustrated but other forms of corrugations may be used if so desired or more advantageous. Each of the cylinders is spaced from the adjoining cylinders to provide flow spaces 41 therebetween, but the inside diameter of each cylinder is also less than the outside diameter of the cylinder therewithin whereby the corrugations of the cylinders interfit or intermesh to some extent as shown in Fig. 5 of the drawings. The interfitting of the corrugations causes the flow spaces 41 to be tortuous and prevents gas from flowing from one end of the drum 31 to the other end thereof in a straight line without contacting or engaging the walls of the cylinders 40.

A transverse partition 42 extends across the lower portion of the shell 20 between the inlet fitting 22 and the scrubbing drum 31, the upper edge of the partition terminating slightly above the bottom edge of the drum core 35. A body of scrubbing oil or other cleaning liquid 43 is carried within the shell 20 between the partition 42 and the head 21 carrying the outlet fitting 23, and the lower portion of the drum 31 is immersed in this body of oil. Oil is mentioned as a scrubbing material since it is most often used, but it is obvious that other types of cleaning or scrubbing agents may be employed, such as glycols, amines, water-miscible oils, and the like.

As the scrubbing drum 31 is revolved by the drum core 35, the corrugated cylinders 40 are passed successively through the body of oil 43 and upwardly in a circular path into the course of the gas stream flowing through the shell 20. The gas is forced to pass between the convolutions of the adjacent scrubbing cylinders and hence impinges repeatedly upon a plurality of surfaces freshly wet with scrubbing oil. Dust, dirt, and foreign matter, adhere to the oil-wet surfaces while the gas passes onwardly in a cleaned and scrubbed condition. In the course of flowing through the entire scrubbing drum, and repeatedly being subjected to the cleaning and scrubbing action of the oil-wet convolutions, the gas stream is completely cleansed and the dirt and other foreign matter are removed therefrom. As the drum continues to rotate, the cylinders continuously pass through the oil bath whereby the foreign matter and other accrued material is flushed from the surfaces of the scrubbing cylinders into the body of oil. Simultaneously, the surfaces are coated with a fresh layer of oil, while the removed material settles to the bottom of the shell 20.

For preventing a quantity of oil from being trapped between adjacent ones of the corrugated cylinders and running endlessly in the space therebetween without replacement or replenishment from the body of oil 43, a plurality of partition rods 44 are provided. As shown in Figs. 5 and 15, the rods are elongate and have a zigzag or corrugated shape corresponding to the zigzag courses or paths 41 through which the gas stream flows. At least one of the rods is provided between each pair of the concentric cylinders 40, and the rods are preferably arranged throughout the cross-section of the drum 31 in a spiral relationship, as shown in Fig. 4. The rods or stops prevent oil from flowing continuously around the drum as it revolves, and force it to drain from the open ends of the drum whereupon additional quantities of oil are picked up from the oil bath 43 by the adjacent surfaces of the two cylinders between which the rod is situated. It is obvious that only one rod is necessary between each pair of cylinders to accomplish this result, and it is further obvious that it is desirable to have the rods spaced or staggered with respect to one another as illustrated by the spiral arrangement of Fig. 4 whereby all of the rods will not be in a position at one time to cause drainage of oil from between the scrubbing cylinders.

A further provision is desirable in the scrubbing drum structure in the form of a narrow paddle or blade 45 positioned parallel to the axis of the drum 31 and projecting radially from the outer periphery thereof. As the scrubbing drum revolves, the paddle or blade 45 is caused to pass around the inner surface of the shell 20, in close proximity thereto, and thereby acts in much the same manner and serves much the same purpose as the hereinbefore described partition rods 44. The foreign matter and other material which settles within the oil bath to form an accumulation in the bottom thereof is raked from beneath the scrubber drum and thereby prevented from building up beneath same to an extent sufficient to impede the revolution of said drum. Of course, several of the paddles or blades 45 may be employed, but it has been found that one such blade is sufficient for the purposes desired.

The shell 20 is relatively large and will accommodate a considerable quantity of scrubbing oil. It is necessary, however, to replace or replenish the oil from time to time. To drain the oil from the shell a goose neck drain pipe 46 is provided and positioned within the oil bath 43. A similar goose neck drain pipe 46' is positioned in the upstream portion of the shell between the separator 25 and the partition 42 for draining the fluid filtered from the gas by the separator 25. Both pipes extend through the side wall of the shell and have their open ends directed downwardly into close proximity with the bottom portion of the shell so as to draw off liquid from the very lowest portion of said shell. In addition, an access opening or manhole 47 is provided in the bottom of the shell and is closed by a suitable plate 48.

Since there is some tendency for the gas stream to bypass the scrubbing drum 31 and to flow between the outer surface of said drum and the upper portion of the shell, an arcuate baffle or deflector plate 49 extends inwardly from the inner periphery of the shell 20 adjacent the upstream side of the scrubbing drum 31. The inner edge of the baffle 49 overlies the outer edge or periphery of the drum 31 and obstructs the gas stream from flowing around the outer surface of the drum. The baffle need not extend entirely around the shell, but need only project beneath the surface of the oil bath 43.

In the operation of this scrubber, the gas stream enters through the fitting 22 and is subjected to an initial scrubbing and cleaning action in the separator 25 wherein most of the liquids and some larger particles of foreign matter are removed. From this point, the gas passes through the scrubbing drum 31, flowing from end to end thereof in a plurality of tortuous paths between the concentric corrugated cylinders 40. The gas stream constantly impinges upon the oil-wetted surfaces of the cylinders whereby the balance of the foreign material is scrubbed from the gas and in addition, any fine mist or liquid particles are caught and removed. The gas passes from the downstream side of the drum cleaned substantially of all foreign material. Of course, the gas will be flowing under an appreciable pressure, and the scrubbing drum will offer some resistance to this flow. This creates a pressure differential across the scrubbing drum and results in a raising of the level of the oil bath adjacent the outlet fitting 23 and a corresponding lowering of the level of the oil bath adjacent the inlet portion of the scrubbing drum. It is for this reason that the shell 20 is mounted in an inclined position since the surface of the oil bath 43 will be similarly inclined when the scrubber is operating. Since the fitting 23 is positioned centrally of the downstream head 21, the inclined positioning of the shell raises the outlet fitting and permits the use of the largest possible quantity of cleaning oil in the smallest possible shell which will accommodate the gas flow. Regardless of other provisions, the body of cleaning oil is going to assume an inclined position during operating conditions, and the scrubber is correspondingly inclined to reduce the size and the expense of the structural elements thereof.

The mounting of the separator 25 and the scrubber 31 in a single horizontal vessel in the order described is important and provides numerous advantages and beneficial results.

The removal of the liquids before the solids prevents the liquids from accumulating in and building up the volume of the body of scrubbing oil 43. Should such accumulation occur, due to excessively large quantities of liquid in the gas, however, the positioning of both the separator 25 and the scrubber 31 in a single vessel prevents the excess liquid from leaving the vessel 20 via the outlet 23. Instead, the excess liquid would spill over the partition 42 into the space below the separator 25. Hence, a compressor or other equipment downstream of the scrubber would be protected. Of course, the utilization of a single vessel also reduces the cost of the unit and conserves materials in that only one vessel, one set of piping, and one foundation is required, and a complete scrubber is provided which requires much less space than a plurality of vessels.

Since these scrubbers are used extensively on gas pipe lines having compressor stations at intervals, it is important that pressure drops be held to a minimum. Pressure drops represent a constant expense in compressor horsepower since the pipe line pressures must be held to a level sufficient for transmission purposes. Therefore, a piece of equipment having a high pressure drop causes the operator an additional expense for every cubic foot of gas passing through the equipment since the lost pressure must be restored by horsepower-consuming compressors.

The present invention holds pressure drops at a very low level due to the inclusion of all of the scrubbing elements in a single vessel. Thus, enlargement and contraction losses are minimized and operating expenses reduced.

A modified form of the invention is shown in Figs. 8 and 9 in which two of the scrubbing drums are employed, each drum having three scrubbing stages.

In this modification, the shell 50 is carried in an inclined position upon the legs 51 and is provided with an inlet head 52 and an outlet head 53. A gas stream inlet pipe 54 is connected into the head 52, and a similar gas outlet pipe 55 is connected into the head 53. Upon the inner surface of the inlet head 52, an open-ended housing 56 is mounted in alinement with the inlet pipe 54, and a vaned preliminary diffusion structure 57 for dispersing the incoming gas stream is carried within the housing 56.

A driving shaft 58 extends longitudinally and axially of the shell 50, one end of the shaft extending through the head 53 and being supported therein by a suitable seal and bearing 59, while the opposite end of the shaft is supported in a bearing 60 carried by a spider 61 extending transversely of the housing adjacent the inlet head 52. A pair of scrubber drum cores of hollow cylindrical configuration with closed ends, and so designed as to be of such a size as to allow the maximum gas flow through the scrubbing element when the oil baths are filled to the required level, are secured upon the shaft 58, one of the cores 62 being positioned adjacent the spider 61, and the other core 63 being positioned adjacent the bearing 59. The core 62 carries three scrubbing drums 64 in spaced parallel arrangement, the drums being similar in structure to the drum 31 previously described but being considerably shorter or less in length than the drum 31. The gas stream passes through the open sides or ends of the scrubbing drum and is processed in much the same manner as that previously described with the exception that the gas may recombine and may commingle in the spaces 65 between the adjacent scrubber drums. In this manner, a more thorough cleaning is given by subjecting the gas stream to a plurality of cleaning operations of short duration in place of a single cleaning operation of longer duration.

A similar set of scrubber drums 66 are carried upon the scrubber drum core 63, and are provided with spaces 67 therebetween. This second set of scrubber drums constitutes an entirely separate cleaning operation and assures the removal of substantially all foreign material from the gas stream.

In order that the operation of the two sets of drums shall be as independent as possible, a transverse partition 68 is provided in the lower portion of the shell 50 adjacent the center thereof and extends upwardly between the two sets of drums, terminating a short distance below the shaft 58. A body of cleaning oil 69 is carried in the shell upon the upstream side of the partition 68, and a similar body of oil 70 is carried upon the downstream side of said partitions. Thus, each of the sets of scrubbing drums 64 and 66 are provided with an independent oil bath or oil supply, whereby the foreign matter removed in the first set of drums does not contaminate the oil bath of the second set of drums. Obviously, the bulk of the dirt and foreign matter will be removed and deposited in the oil bath 69, and the bath 70 is thus maintained in a relatively clean condition free of suspended matter. If so desired and if the quality of the gas to be scrubbed is such as to make it advisable, the chamber between the inlet head 52 and the partition 68 can be left empty, thereby allowing the first set of scrubbing elements to act as a liquid separator and serve a similar function to the separator 25 previously described.

A drain 71 is provided for the chamber on both the downstream and the upstream side of the partition 68, while an electric motor 72 drives the shaft 58 through a speed reducer 73 and suitable gearing 74. This driving arrangement is similar to that contemplated for the first form of the invention described but is carried at the end of the shell 50 rather than at the side thereof.

Here again, the surfaces of the oil baths will assume an inclined position under operating conditions, and one of the objects of dividing the shell into two chambers with the partition 68 is to thus divide the pressure differential across the entire vessel thereby reducing the amount of inclination required for the unit. The inclined position of the shell as well as the indicated levels of the oil baths take this fact into consideration and provide for the efficient utilization of the gas scrubbing space available. The gas, in passing through this form of the invention, will be subjected to a plurality of cleaning and scrubbing steps in the first set of scrubber drums and the majority of the foreign material will be removed at this point. The gas then passes to the second set of scrubber drums and is subjected to an entirely separate cleaning action implemented by a relatively uncontaminated bath of cleaning oil. In this second step, the last traces of foreign material are removed and very clean gas will pass outwardly through the outlet pipe 55. When the downstream chamber is left empty of oil or cleaning fluid, the gas, in passing through the vessel, is subjected to a liquid separating action in the first set of scrubbing drums 64 and to a scrubbing action in the second set of drums 66.

A further modification of the invention is illustrated in Fig. 7 of the drawings, being similar in some respects to both of the previously described forms. The gas stream enters the shell 75 through an inlet fitting 76 and immediately impinges upon a transverse baffle plate 77 extending across the shell in alinement with the inner end of the fitting 76. The gas then passes through an initial scrubber and cleaner 78 similar to the scrubber or separator 25 and flows into a scrubber drum 79 similar in most respects to the drum 31. Provision is made for discharge of the gas stream from the shell through an outlet fitting 80 carried in the upper portion of the shell, while a driving arrangement 81, similar to that shown in Fig. 8, is employed to drive the scrubber drum shaft 82.

This modification of the invention employs a novel agitating element in the form of rods 83 extending in a helix about the outer periphery or surface of the scrubber drum 79. Being arranged as portions of helices, the rods 83 not only agitate the sediment which tends to collect beneath the drums 79, but because of their longitudinal inclination move the sediment toward the downstream end of the shell and out from beneath the scrubber drum. The dirt and foreign matter is thus, not only prevented from settling into a hard compact mass, but is moved from the point at which it will cause difficulties in the revolving of the scrubber drum.

A novel form of gas seal is also employed for the drum 79 and includes a baffle 84 similar to the baffle 49 and similarly positioned. The drum 79 is provided with a sealing band 85 extending about its outer surface and positioned upon its upstream side. The projecting edge of the band 85 revolves in very close proximity to the baffle 84 so as to reduce to an absolute minimum that portion of the gas stream which bypasses the scrubber drum and is not subjected to a full cleaning action.

Embodiments of the invention as applied to air filters are illustrated in Figs. 10 through 14 of the drawings. The principles here employed are substantially the same as those of the gas scrubbers which have been described, and while specific modifications have been made to apply such principles to the scrubbing or filtering of an air stream, such as a stream of air being drawn into an internal combustion engine of large size, the mode of operation involved is similar.

The air filter shown in Fig. 10 includes an upright housing 86, circular in vertical cross section and containing a scrubbing drum 87 similar to the drums previously described. The air stream is admitted to the upper portion of the housing through an opening 88 protected by inclined louvers 89 which prevent the entry of rain and the like through the opening 88. The drum 87 is rotatably mounted upon a horizontal shaft 90 carried upon suitable bearing supports 91 within the housing and positioning the drum with one lateral face adjacent the opening 88. A seal or diverter baffle 92, similar to the baffle 84, is mounted within the housing and cooperates with the inlet side of the drum 87 to prevent bypassing of the air stream around said drum.

A vertical partition 93 projects upwardly from the bottom of the housing 86 adjacent the rearward side, or downstream side, of the scrubbing drum 87 and defines an oil chamber within which is contained a body of a cleansing agent or filtering oil 94. As the scrubbing drum 87 is revolved, its lower portion passes through the body of oil 94, and the cleansing and filtering action is carried out as previously described.

An enlarged air outlet pipe 95 extends from the upper and rearward portion of the housing, and for the purpose of revolving the drum 87, a fan blade or impeller 96 is mounted within the housing in close proximity to the outlet pipe so as to be revolved by the air passing outwardly through said pipe. The fan 96 drives a gear pinion 97 through a suitable speed reduction box 98, and the pinion 97 meshes with a gear wheel 99 secured upon the shaft 90. The speed reduction accomplished within the gear box 98 and by the difference in diameters of the pinion 97 and the gear wheel 99, cause the drum 87 to revolve at a much lower speed than the fan 96, and a quite considerable mechanical advantage is thus obtained. The outgoing air passing through the outlet pipe 95 furnishes the motive power for revolving the drum 87, and the unit thus becomes self-powered.

In the description of the various modifications of this invention, no directions have been given for spacing from one another the corrugated cylinders which go to make up the various filtering or scrubbing drums. The reason for this omission is the fact that a variety of structures may be employed for this purpose, and it is not desired to limit the invention to any one thereof. As an example, however, of one type of construction which may be employed, there are shown in Fig. 11 a plurality of radial bars or tie members 100 extending across the rearward surface or side of the drum 87 contiguous to the rearward or downstream edges of the concentrically arranged corrugated cylinders. The bars 100 are secured to the edges of the cylinders, as by soldering or welding, and serve to support the cylinders and to space them one from the other.

A further modification of the air filter is shown in Figs. 12 through 14, this form of the invention differing from that shown in Fig. 10 in that the filter drum 87 is power driven by an electric motor 101 carried in the lower portion of the housing 86. The motor 101 is directly connected to the speed reducer 98 which drives a small pulley 102 connected by a driving belt 103 to a driven pulley 104 carried upon the shaft 90. The arrangement of the louvers 89 is more fully illustrated in Fig. 14, it being noted that the louvers are inclined from the center of the housing to the outer portion thereof so that water which collects upon said louvers may drain off laterally. It is further shown that there is a sump 105 in the lower portion of the housing in which sediment and foreign matter may collect.

It is noted that each of the scrubbing drums utilized in the various modifications of the invention, include a central cylindrical core of appreciable diameter with scrubbing elements arranged concentrically thereabout. This is an important feature in that it results in a maximum gas-flow space within a shell or tank of a given diameter. If the scrubbing elements extended entirely to the center or axis of the scrubbing drum, as would be the case if the elements were carried on a simple shaft, approximately fifty percent of the cross-sectional area of the scrubber shell would be available as a gas-flow space. The other half of the shell would be occupied by the oil bath. The bath must be carried at a level high enough to wet each of the scrubbing elements.

In my structure, the oil level must extend only into contact with the lower portion of the scrubber drum core in order to wet all of the scrubber elements or cylinders. I have discovered that the available gas-flow space is thus increased to about sixty percent of the cross-sectional area of the scrubber shell whereby a larger volume of gas may be handled by a scrubber shell of a given diameter. The lowering of the oil bath level increases the flow space, and the increase is greater than the area occupied by the scrubber drum core. Of course, the exact diameter of the drum core is a matter of design in each diameter of shell and may be calculated mathematically. It is not intended that my invention be limited to exact designs, and the above-described advantage has been brought out as a desirable but not essential feature of the invention.

In Figs. 16 through 19 of the drawings there is illustrated a still further modification of the invention wherein more than one of the scrubbing drums are employed, the drums being arranged in consecutive fashion within the scrubbing vessel, and the gas stream being divided into more than one portion, each of the portions flowing through one of the scrubber drum units.

This modification has considerably increased gas handling capacity over those previously described due to the dividing of the gas stream and the subjection of each portion of the gas stream to an ample area of gas scrubbing surface, and yet, the vessel in which the scrubber is contained does not become unduly large because of the consecutive positioning of the scrubbing units.

In high pressure gas vessels, considerable caution must be exercised to avoid a necessity for vessels of large diameter since the necessary wall thickness of such vessels increases rapidly as the diameter of the vessel is increased. Indeed, the present industrial requirements governing the building of such vessels virtually preclude the construction of vessels of very large diameter due to the extreme wall thicknesses necessitated with the consequent extreme increase in weight and cost of the vessel as well as difficulty of fabrication.

In order to obtain increased gas handling capacity for the scrubber unit, it is necessary that the area of the oil wetted scrubbing surfaces exposed to the gas stream be increased, but the foregoing discourages the achieving of such increase in area by utilization of larger vessels. This last mentioned modification of the invention desirably achieves such increase in capacity without any increase in size of the vessel, and therefore without any increase in wall thickness, cost, weight, or fabricating problems connected with construction of the unit.

In the modification the numeral 106 designates an elongate, horizontal, cylindrical vessel having dished heads 107 at each end thereof. There is provided a flanged inlet conductor 108 extending through one of the heads and a flanged outlet conductor 109 extending through the opposite head. The vessel is mounted upon suitable supporting posts 110 and carries in its lower portion clean-out and drain sumps 111.

A deflector plate 112 is positioned within the vessel 106 closely adjacent the inlet 108 so as to divert and break up the gas stream entering through said inlet and to prevent the stream from impinging directly upon the scrubber parts.

The scrubber structure may be divided into sections designated as a first dry scrubber section 113 positioned adjacent the inlet fitting 108, a wet scrubber section 114 disposed in the central portion of the vessel 106, and a second dry scrubber section 115 positioned in the vessel adjacent the outlet fitting 109. The first dry scrubber section functions as a liquid gas separator and removes from the gas stream virtually all of the liquid particles present, along with some of the larger particles of foreign matter such as dirt or scale. This separator structure comprises a horizontal partition 116 disposed in the lower portion of the vessel and extending from the inlet end thereof to a point adjacent the wet scrubber section 114. Separated liquids collect upon this partition and drain over the downstream edge thereof into the bottom of the vessel 106. A liquid gas separator in the form of a rectilinear bundle 117 of vertically disposed corrugated baffle plates 117' is carried upon the partition 116 and extends transversely of the vessel at right angles to the line of gas flow. A portion of the gas stream is caused to flow through the bundle between the corrugated plates whereby the gas is repeatedly impinged upon and scrubbed by the surfaces of the plates to collect and remove liquid particles therefrom. Each of the plates is provided with a plurality of channel elements 118 extending vertically within the plate bundle and having their open sides facing the incoming gas flow. Separated liquids collect in these channel sections and are conducted thereby to the lower portion of the vessel 106.

There is also provided an additional pair of the plate bundles, designated by the numeral 119, these bundles also extending vertically within the tank but being disposed at right angles to the bundle 118 and spaced near the lateral walls of the tank. The upstream ends of the bundles 119 are connected to the ends of the bundle 117 by short vertical partitions 120 whereby gas is prevented from flowing between the bundles, and the downstream ends of the bundles 119 are connected to the side walls of the tank by transverse partitions 121 in order to prevent the gas stream from bypassing the bundle structures entirely. With this arrangement, as illustrated in Fig. 16, the incoming gas stream is divided into three portions, one of which flows through the bundle 117 and the other two of which flow through the bundles 119. The stream is thus divided and each of the portions subjected to a thorough scrubbing and separating action by passage through a separating bundle of adequate cross-section. The three bundles enclose a central space 122 into which all of the gas stream enters and from which the gas stream passes between the downstream ends of the bundles 119.

Adjacent the partitions 121, the vessel is provided with a supporting spider 123 extending vertically upwardly from the bottom of the vessel and carrying a suitable supporting bearing 124 at its central portion. A similar support 125 is positioned in the vessel 106 between the wet scrubbing section and the second dry scrubbing section 115, and this support also carries a suitable bearing 126 upon its medial part, the bearings 124 and 126 desirably being alined with the longitudinal axis of the vessel 106. A scrubber drum shaft 127 is rotatably supported in the bearings and carries upon its downstream extremity a suitable gear drive 126' operatively connected to an external source of rotative power 127'.

A pair of spaced, tubular cylinders, 128 and 129, are positioned in consecutive order upon the shaft 127 and supported thereby so as to revolve therewith. Each of the cylinders or cores has mounted thereon a scrubbing drum structure similar to the scrubbing drum structures described hereinbefore, one drum 130, carried by the core 128, being disposed adjacent the bearing 124, and one drum 131, carried by the core 129, being positioned adjacent the bearing 126 whereby an appreciable longitudinal space 132 is provided between the two drum units.

As shown in Fig. 16, the drum 130 is of such diameter that its periphery closely approaches the inner wall of the vessel 106, while the drum 131 is of slightly reduced diameter to provide an axial flow space 133 between the periphery of the drum 131 and the inner wall of the vessel 106. A short transverse partition 134 extends vertically upwardly from the bottom of the vessel to a point slightly above the lower portions of the cores 128 and 129 in order to retain a body of oil or scrubbing or cleaning liquid 135 in the lower portions of the vessel sections 114 and 115. As illustrated, the level of the oil is substantially tangent to the lower extremities of the cores 128 and 129 whereby bypassing of gas below said cores is precluded. Of course, as the shaft 127 is revolved by the driving means 127', the scrubbing drums 130 and 131 are caused to pass through the body of cleaning liquid 135, and the gas stream is impinged upon the multitudinous surfaces of the scrubbing drums thus wetted by the cleaning or scrubbing liquid.

The gas stream leaving the section 13 encounters the first scrubbing drum 130, and at this point, the gas stream is divided, a portion thereof passing between the concentric corrugated plates which make up the drum 130, and a portion of the gas stream passing through the interior of the hollow core 128. The drum 131 is provided with a conical baffle or shielding member 136 which extends from the periphery of said drum at the upstream edge thereof to the downstream end of the core 128. This shield or baffle, being imperforate, forces the gas passing between the corrugated cylinders of the drum 130 to be deflected outwardly in the space 132 and to pass around the outer periphery of the drum 131 through the annular space 133. This portion of the gas stream, having been adequately cleaned and scrubbed by the drum 130, is thus bypassed around the drum 131 and flows toward the outlet end of the vessel 106 around the periphery of the drum 131.

The second wet scrubbing unit, represented by the drum 131, also carries an internal baffle unit or shield 137 of a generally conical shape extending from the upstream edge of the core 129 to the surface of the shaft 127 at a point approximately in alinement with the downstream edge of the core 128. The portion of the gas stream passing through the interior of the core 128 is thus deflected outwardly by the shield or baffle 137 and caused to flow between said shield and the shield 136 into the spaces between the corrugated cylinders making up the bundle 131. The gas is thus prevented from passing through the interior of the core 129 and is forced to follow a path wherein it is subjected to the cleaning and scrubbing action of the corrugated cylinder structure of the drum 131 and is adequately cleaned and scrubbed thereby. This gas exits from the downstream end of the bundle 131 and joins the other portion of the gas which was bypassed around the bundle or drum 131.

It is to be noted that several of the details of construction of the wet scrubbing section have not been described in that the same are substantial duplicates of those previously described. Adequate sealing means for preventing bypassing of the gas stream, supporting means for the drum structures, and other details of the structure are subject to variation, and in any event have received ample discussion hereinbefore.

The second dry scrubbing section 113 is substantially a mirror image of the section 113 and duplicates the details thereof. There are provided a pair of separator bundles 138, both extending vertically of the vessel and parallel to the longitudinal axis thereof, one of the bundles being positioned on each side of the vessel, and a third bundle 139 extending transversely and vertically of the tank and adjoining the downstream ends of the bundles 138. Here again, the gas stream is divided into three portions, each of which passes through one of the separator bundles, and all of which again combine downstream of the bundles to leave the vessel through the outlet fitting 109. The separator bundles 138 are supported upon a transverse plate 140 extending horizontally in the vessel and having a marginal skirt 141 depending below the surface of the body of cleaning liquid 135. The bundle 139 is carried upon a separate, angular support 142 extending horizontally and transversely of the vessel and spaced from the skirt 141 of the plate 140. In order to prevent the cleaning liquid from being carried out of the vessel by the gas stream through the outlet 109, the vessel is also provided with a horizontal, transverse baffle or partition member 143 spaced from the angular member 142 and adjoining the head 107 at the outlet end of the tank. The baffle 143 also has a depending marginal lip 144 upon its upstream edge, the lip extending below the level of the body of cleaning liquid and adding rigidity to the baffle 143 as well as enhancing the effect of the baffle in precluding the flowing of the cleaning liquid from the vessel by the rapidly moving gas stream. The spacing of the baffle from the angular member 142 and the spacing of the latter from the plate 140 provides ample drainage space for liquids or other materials removed from the gas stream by the separator bundles 138 and 139, and at the same time, the relative closeness of these elements, along with the provision of the depending marginal lips protects the surface of the body of cleaning liquid and eliminates the possibility that portions of such liquid will be picked up and carried out of the vessel by the gas stream.

The second dry scrubbing section 115 provides a final cleaning step in the operation of this scrubber unit, removing from the gas stream any liquid particles which may be present therein or any particles of the cleaning liquid which may have been picked up by the gas stream as it passed through the wet scrubbing section. Thus, not only is the gas thoroughly cleaned and scrubbed, but a final separating step is provided wherein completeness of the cleaning and separating action is assured.

As pointed out hereinbefore, this last described modification of the invention greatly increases the gas cleaning and scrubbing capacity of a vessel of given diameter, experience having shown that the capacity of the scrubber is increased about 80% (by volume of gas handled) over that of a vessel of the same size having only a single scrubbing drum through which all of the gas must pass.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment positioned above the predetermined maximum level of the body of liquid, the partition having means for conducting gas from the separating compartment to the cleaning compartment, and a gas cleaning unit in the cleaning compartment between the partition and the gas outlet, the gas cleaning unit comprising, a scrubbing element having multiple surfaces contacted by the gas and wetted by the liquid in the cleaning compartment, and means for directing gas through the element, the element being positioned within the cleaning compartment.

2. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment positioned above the predetermined maximum level of the body of liquid, the partition extending from the bottom of the vessel to a point spaced from the top of the vessel whereby gas may flow over the partition from the separating compartment to the cleaning compartment, and a gas cleaning unit in the cleaning compartment between the partition and the gas outlet, the gas cleaning unit comprising, a scrubbing element having a large surface area exposed to the gas and wetted by the liquid in the cleaning compartment, and means for directing gas through the element, the element being positioned within the cleaning compartment.

3. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment spaced from the predetermined maximum level of the body of liquid, the partition having means for conducting gas from the separating compartment to the cleaning compartment, and a gas cleaning unit in the cleaning compartment between the partition and the gas outlet, the gas cleaning unit comprising a scrubbing element having multiple surfaces contacted by the gas and wetted by the liquid in the cleaning compartment, means for directing gas through the element, the element being positioned within the cleaning compartment.

4. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment, the vessel and gas outlet being constructed and arranged to prevent liquid from entering the gas outlet from the predetermined maximum level of the liquid, the partition having means for conducting gas from the separating compartment to the cleaning compartment, and a gas cleaning unit in the cleaning compartment between the partition and the gas outlet, the gas cleaning unit comprising, a scrubbing drum rotatably mounted in the vessel, said drum being formed of a plurality of concentrically arranged scrubbing cylinders radially spaced from one another to form circumferential spaces through which gas may flow, means for directing gas through the drum, and means for revolving the drum, the drum being positioned within the cleaning compartment so as to have its lower portion immersed in the body of liquid therewithin.

5. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment, the vessel and gas outlet being constructed and arranged to prevent liquid from entering the gas outlet from the predetermined maximum level of the liquid, the partition having means for conducting gas from the separating compartment to the cleaning compartment, and a gas cleaning unit in the cleaning compartment between the partition and the gas outlet, the gas cleaning unit comprising a scrubbing drum rotatably mounted in the vessel, said drum being formed of a plurality of concentrically arranged scrubbing cylinders radially spaced from one another to form circumferential spaces through which gas may flow, said cylinders having circumferential corrugations, means for directing gas through the drum, and means for revolving the drum, the drum being positioned within the cleaning compartment so as to have its lower portion immersed in the body of liquid therewithin.

6. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment, the vessel and gas outlet being constructed and arranged to prevent liquid from entering the gas outlet from the predetermined maximum level of the liquid, the partition having means for conducting gas from the separating compartment to the cleaning compartment, and a gas cleaning unit in the cleaning compartment between the partition and the gas outlet, the gas cleaning unit comprising, a scrubbing drum rotatably mounted in the vessel, said drum being formed of a plurality of concentrically arranged scrubbing cylinders radially spaced from one another to form circumferential spaces through which gas may flow, said cylinders having circumferential corrugations, impervious partitioning bars extending substantially longitudinally of the drum between adjacent cylinders and completely closing the circumferential spaces between the adjacent cylinders at selected points, means for directing gas through the drum, and means for revolving the drum, the drum being positioned within the cleaning compartment so as to have its lower portion immersed in the body of liquid therewithin.

7. A unitary combination gas scrubber and cleaner including, a single horizontal vessel, an upright partition in the vessel dividing the vessel into a separating compartment and a cleaning compartment, said partition being constructed to maintain a body of liquid in the cleaning compartment and to allow said liquid to overflow into the separating compartment if said liquid rises above a predetermined maximum level, a gas inlet to the separating compartment, a liquid and gas separating unit within the separating compartment and separating the remainder of the interior of the vessel from the gas inlet whereby gas entering the inlet is forced to pass through said separating unit, a liquid outlet from the separating chamber, a gas outlet from the cleaning compartment positioned above the predetermined maximum level of the body of liquid, the partition having means for conducting gas from the separating compartment to the cleaning compartment, and a gas cleaning unit in the cleaning compartment between the partition and the gas outlet, the gas cleaning unit comprising a scrubbing drum rotatably mounted in the vessel, means for directing gas through the drum, and means for revolving the drum, the drum being positioned within the cleaning compartment so as to have its lower portion immersed in the body of liquid therewithin.

8. A unitary combination gas scrubber and cleaner, including a single elongate horizontal vessel, a gas inlet to the vessel, a liquid and gas separating unit within the vessel and separating the remainder of the interior of the vessel from the gas inlet whereby gas entering the inlet is forced to pass first through said separating unit whereby the bulk of the liquid present in the gas is removed therefrom, a gas outlet from the vessel, a liquid-wetted gas scrubbing unit in the vessel between the separating unit and the gas outlet, the gas scrubbing unit comprising a scrubbing element having multiple surface areas exposed to the gas and wetted by a cleaning liquid, means for maintaining a body of cleaning liquid in contact with the scrubbing element for wetting the same, means for directing the gas through the scrubbing element whereby predominantly solid particles are removed from the gas by contact of the gas with the liquid-wetted surfaces of said element, and a partition in the vessel excluding the body of cleaning liquid from the proximity of the separating unit, the partition having overflow means on its upper portions spaced below the gas outlet whereby the body of cleaning liquid may overflow into the portion of the vessel in proximity to the separating unit and be prevented from entering the gas outlet.

9. A gas scrubber including a horizontal vessel, a gas inlet into the vessel, a gas outlet from the vessel, a first scrubbing element in the vessel extending transversely of the vessel and occupying a major portion of the cross-sectional area of the vessel, means for passing a portion of the gas through the first scrubbing element and for by-passing a second portion of the gas around said element, a second scrubbing element in the vessel extending transversely thereof and occupying a major portion of the cross-sectional area of the vessel, means for by-passing the first portion of gas around the second scrubbing element and for passing the second portion of gas through the second scrubbing element, and means for maintaining in the lower portion of the vessel a body of cleaning liquid in contact with the lower portion of the first and second scrubbing elements for wetting the same.

10. A gas scrubber as set forth in claim 9, and a liquid and gas separating unit within the vessel between the gas inlet and the first scrubbing element.

11. A gas scrubber as set forth in claim 10, and a liquid and gas separating unit within the vessel between the gas outlet and the second gas scrubbing element.

12. A gas scrubber including, a vessel, a gas inlet into the vessel, a gas outlet from the vessel, a first scrubbing drum rotatably mounted in the vessel, a second scrubbing drum rotatably mounted in the vessel and spaced from the first drum, the drums extending transversely of the vessel and each occupying a major portion of the cross-sectional area of the vessel, means for directing a first portion of the gas through the first scrubbing drum and by-passing a second portion of the gas around the first drum, means for directing the second portion of the gas through the second scrubbing drum and by-passing the first portion of the gas around the second scrubbing drum, means for maintaining in the vessel a body of liquid contacting the lower portions of the drums, and means for revolving the drums in the vessel.

13. A gas scrubber including, a vessel, a gas inlet into the vessel, a gas outlet from the vessel, a first scrubbing drum rotatably mounted in the housing and extending transversely thereof across substantially the entire area of the housing, the first drum being formed of a plurality of concentrically arranged cylinders surrounding a hollow core, a first portion of the gas flowing through the drum and a second portion of the gas flowing through the hollow core, a second scrubbing drum rotatably mounted in the housing, said second drum being formed of a plurality of concentrically arranged cylinders and extending transversely of the vessel and occupying a major portion of the cross-sectional area of the vessel, baffle means for directing the first portion of the gas through the space between the periphery of the second scrubbing drum and the wall of the vessel, and means for directing the second portion of the gas flowing through the hollow core of the first scrubbing drum through the second scrubbing drum, means for maintaining in the vessel a body of cleaning liquid in contact with the lower portions of both drums, and means for revolving the drums in the vessel.

14. A gas scrubber as set forth in claim 13, and liquid and gas separating units between the scrubber drums and the gas inlet and the gas outlet.

15. A gas scrubber as set forth in claim 14 wherein the liquid and gas separating units each comprise a rectilinear separator bundle extending transversely of the vessel and a pair of rectilinear separator bundles extending longitudinally of the vessel and spaced from the side wall thereof whereby amplified separator bundle areas are presented to the gas flowing through the vessel.

16. A gas scrubber including, a horizontal vessel, a gas inlet into the vessel, a gas outlet from the vessel, a first scrubbing element in the vessel extending transversely of the vessel and occupying a major portion of the cross-sectional area of the vessel, means for passing a portion of the gas through the first scrubbing element and for by-passing a second portion of the gas around said element, a second scrubbing element in the vessel extending transversely thereof and occupying a major portion of the cross-sectional area of the vessel, baffles for by-passing the first portion of gas around the second scrubbing element and for passing the second portion of gas through the second scrubbing element, and means for maintaining in the lower portion of the vessel a body of cleaning liquid in contact with the lower portions of the first and second scrubbing elements for wetting the same.

References Cited in the file of this patent

UNITED STATES PATENTS

| Number | Name | Date |
|---|---|---|
| 302,163 | Saladin | July 15, 1884 |
| 901,237 | Graumiller | Oct. 13, 1908 |
| 905,999 | Emerson | Dec. 8, 1908 |
| 1,289,421 | Fairbanks | Dec. 31, 1918 |
| 2,286,480 | Farr | June 16, 1942 |
| 2,349,944 | Dixon | May 30, 1944 |
| 2,610,697 | Lovelady et al. | Sept. 16, 1952 |
| 2,645,304 | McIlvainne | July 14, 1953 |

FOREIGN PATENTS

| Number | Country | Date |
|---|---|---|
| 22,067 | Australia | Nov. 7, 1935 |
| 402,205 | Germany | Sept. 15, 1924 |
| 649,850 | France | Sept. 10, 1928 |